(12) United States Patent
Ujihara

(10) Patent No.: US 12,517,222 B2
(45) Date of Patent: Jan. 6, 2026

(54) DATA CORRECTION APPARATUS, MEASUREMENT SYSTEM, AND CORRECTION METHOD

(71) Applicant: Mitutoyo Corporation, Kawasaki (JP)

(72) Inventor: Hiroki Ujihara, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 924 days.

(21) Appl. No.: 17/445,137

(22) Filed: Aug. 16, 2021

(65) Prior Publication Data

US 2022/0065993 A1 Mar. 3, 2022

(30) Foreign Application Priority Data

Aug. 31, 2020 (JP) .................................. 2020-145594

(51) Int. Cl.
*G01S 7/48* (2006.01)
*G01S 7/486* (2020.01)
(Continued)

(52) U.S. Cl.
CPC .......... *G01S 7/4808* (2013.01); *G01S 7/4802* (2013.01); *G01S 7/486* (2013.01); *G01S 7/497* (2013.01);
(Continued)

(58) Field of Classification Search
CPC ...... G01S 7/4808; G01S 7/4802; G01S 7/486; G01S 7/497; G01S 17/08; G01S 17/26;
(Continued)

(56) References Cited

U.S. PATENT DOCUMENTS

| 6,014,216 A * | 1/2000 | Zorabedian ........ G01B 9/02062 |
|---|---|---|
| | | 356/517 |
| 2016/0131520 A1* | 5/2016 | Martin .................... G01H 9/004 |
| | | 73/597 |

(Continued)

FOREIGN PATENT DOCUMENTS

| CN | 105745837 A | 7/2016 |
|---|---|---|
| CN | 108291962 A | 7/2018 |

(Continued)

OTHER PUBLICATIONS

Jia, Xingyu, et al. "Dynamic absolute distance measurement by frequency sweeping interferometry based Doppler beat frequency tracking model." Optics communications 430 (2019): 163-169. (Year: 2019).*

(Continued)

*Primary Examiner* — Lisa M Caputo
*Assistant Examiner* — Carter W Ferrell
(74) *Attorney, Agent, or Firm* — Oblon, McClelland, Maier & Neustadt, L.L.P.

(57) ABSTRACT

A data correction apparatus including an acquisition part that acquires, from a measurement apparatus capable of periodically measuring a distance while moving at least one of (i) an object to be measured or (ii) at least a part of the measurement apparatus, measurement data in which a first measurement result of the distance is arranged in time series and a second measurement result that is obtained by measuring the distance when the object to be measured and the measurement apparatus are in a stationary state is arranged at a head or a tail of the first measurement result, and a correction part that corrects an error included in the measurement data by applying the measurement data to a recurrence formula based on a time derivative of a measurement result of the measurement apparatus.

12 Claims, 4 Drawing Sheets

(51) Int. Cl.
  *G01S 7/4865* (2020.01)
  *G01S 7/497* (2006.01)
  *G01S 17/08* (2006.01)
  *G01S 17/26* (2020.01)
  *G01S 17/34* (2020.01)
  *G01S 17/50* (2006.01)
(52) U.S. Cl.
  CPC .............. *G01S 17/08* (2013.01); *G01S 17/26* (2020.01); *G01S 17/34* (2020.01); *G01S 7/4865* (2013.01); *G01S 17/50* (2013.01)
(58) Field of Classification Search
  CPC ...... G01S 17/34; G01S 7/4917; G01S 7/4911; G01S 17/50; G01S 7/4865; G01B 11/2441; G01B 9/0209; G01B 9/02083; G01B 9/02004; G01B 9/02003; G01B 9/02057; G01B 9/0207; G01B 11/14; G01B 9/02072; G01B 11/026
  See application file for complete search history.

(56) References Cited

U.S. PATENT DOCUMENTS

2018/0238675 A1* 8/2018 Wan ..................... G01B 9/0203
2019/0310372 A1* 10/2019 Crouch ................... G01S 17/26
2022/0043150 A1* 2/2022 Oshima .................. G01S 17/58
2022/0099800 A1* 3/2022 Horn ....................... G01S 17/34
2023/0111392 A1* 4/2023 Noguchi ............... G01S 13/584
                                                               342/109

FOREIGN PATENT DOCUMENTS

| CN | 108761 429 A | 11/2018 |
| CN | 110114632 A | 8/2019 |
| JP | 3583906 B2 | 11/2004 |
| JP | 2013-190349 A | 9/2013 |
| JP | 2020-85466 A | 6/2020 |

OTHER PUBLICATIONS

Nakamura, Koichiro, et al. "Optical frequency domain ranging by a frequency-shifted feedback laser." IEEE Journal of Quantum Electronics 36.3 (2000): 305-316. (Year: 2000).*
Swinkels, B. L., N. Bhattacharya, and J. J. M. Braat. "Correcting movement errors in frequency-sweeping interferometry." Optics letters 30.17 (2005): 2242-2244. (Year: 2005).*
Jia, Xingyu, et al. "Frequency-scanning interferometry using a time-varying Kalman filter for dynamic tracking measurements." Optics express 25.21 (2017): 25782-25796. (Year: 2017).*
Hara, "Distance Sensing by FSL Laser and Its Application", Optonews, vol. 7, No. 3, 2012, 10 pages (with English Machine Translation).

* cited by examiner

DATA CORRECTION APPARATUS, MEASUREMENT SYSTEM, AND CORRECTION METHOD

CROSS-REFERENCE TO RELATED APPLICATIONS

The present application claims priority to Japanese Patent Application number 2020-145594, filed on Aug. 31, 2020. The contents of this application are incorporated herein by reference in their entirety.

BACKGROUND

A frequency-shifted feedback laser (FSFL) which is provided with a frequency shifter in a cavity (resonator) and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906, and Non-Patent Document 1, "Distance Sensing by FSF Laser and Its Application," by Takefumi HARA, Optonews, Vol. 7, No. 3, 2012, pp. 25-31).

An optical distance meter splits the frequency-shifted feedback laser into a reference light and a measurement light and generates a beat signal by mixing the reference light and a reflected light that is reflected by radiating the measurement light onto an object to be measured. Then, the optical distance meter measures a distance from the optical distance meter to the object to be measured by specifying a frequency of the beat signal. With such an optical distance meter, a three-dimensional geometry of the object to be measured can be measured by continuing to measure the distance while moving the object to be measured, for example. However, since light has a wave-like nature and a Doppler shift occurs due to a relative velocity between a light source and the object to be measured, the frequency of the reflected light reflected from the object to be measured may change. Since the frequency of the beat signal changes in this case, there has been a problem that a reduction in measurement accuracy of the optical distance meter occurred.

SUMMARY

The present disclosure has been made in view of this point, and its object is to easily measure a three-dimensional geometry of the object to be measured with the optical distance meter while suppressing a reduction of measurement accuracy.

A first aspect of the disclosure provides a data correction apparatus including: an acquisition part that acquires, from a measurement apparatus which measures a distance from a reference position to an object to be measured using a frequency-modulated laser beam and is capable of periodically measuring the distance while moving at least one of (i) the object to be measured or (ii) at least a part of the measurement apparatus, measurement data in which a first measurement result of the distance is arranged in time series and a second measurement result that is obtained by the measurement apparatus measuring the distance when the object to be measured and the measurement apparatus are in a stationary state is arranged at a head or a tail of the first measurement result; and a correction part that corrects an error included in the measurement data and based on movement of at least one of the object to be measured or at least a part of the measurement apparatus by applying the measurement data acquired by the acquisition part to a recurrence formula based on a time derivative of a measurement result of the measurement apparatus.

A second aspect of the disclosure provides a measurement system including: the measurement apparatus that measures the distance from a reference position to the object to be measured and includes a laser apparatus that outputs the frequency-modulated laser beam, a branching part that splits the frequency-modulated laser beam output from the laser apparatus into (i) a reference light, which is a portion of the frequency-modulated laser beam, and (ii) a measurement light, which is at least some of the remaining portion of the frequency-modulated laser beam, a beat signal generation part that generates a beat single by mixing the reference light and a reflected light that is reflected by radiating the measurement light onto an object to be measured, a frequency analyzing part that frequency-analyzes the beat signal, and a calculation part that calculates the distance between the reference position and the object to be measured on the basis of a result of a frequency analysis performed on the beat signal by the frequency analyzing part; and the data correction apparatus according to the first aspect, wherein the measurement apparatus generates the measurement data in which the first measurement result including a measurement result of periodically measuring the distance while moving at least one of (i) the object to be measured or (ii) at least a part of the measurement apparatus, is arranged in time series and a second measurement result, obtained by measuring the distance when the object to be measured and the measurement apparatus are in a stationary state, is arranged at a head or a tail of the first measurement result.

DETAILED DESCRIPTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration Example of a Measurement System 1000]

Figure 1:
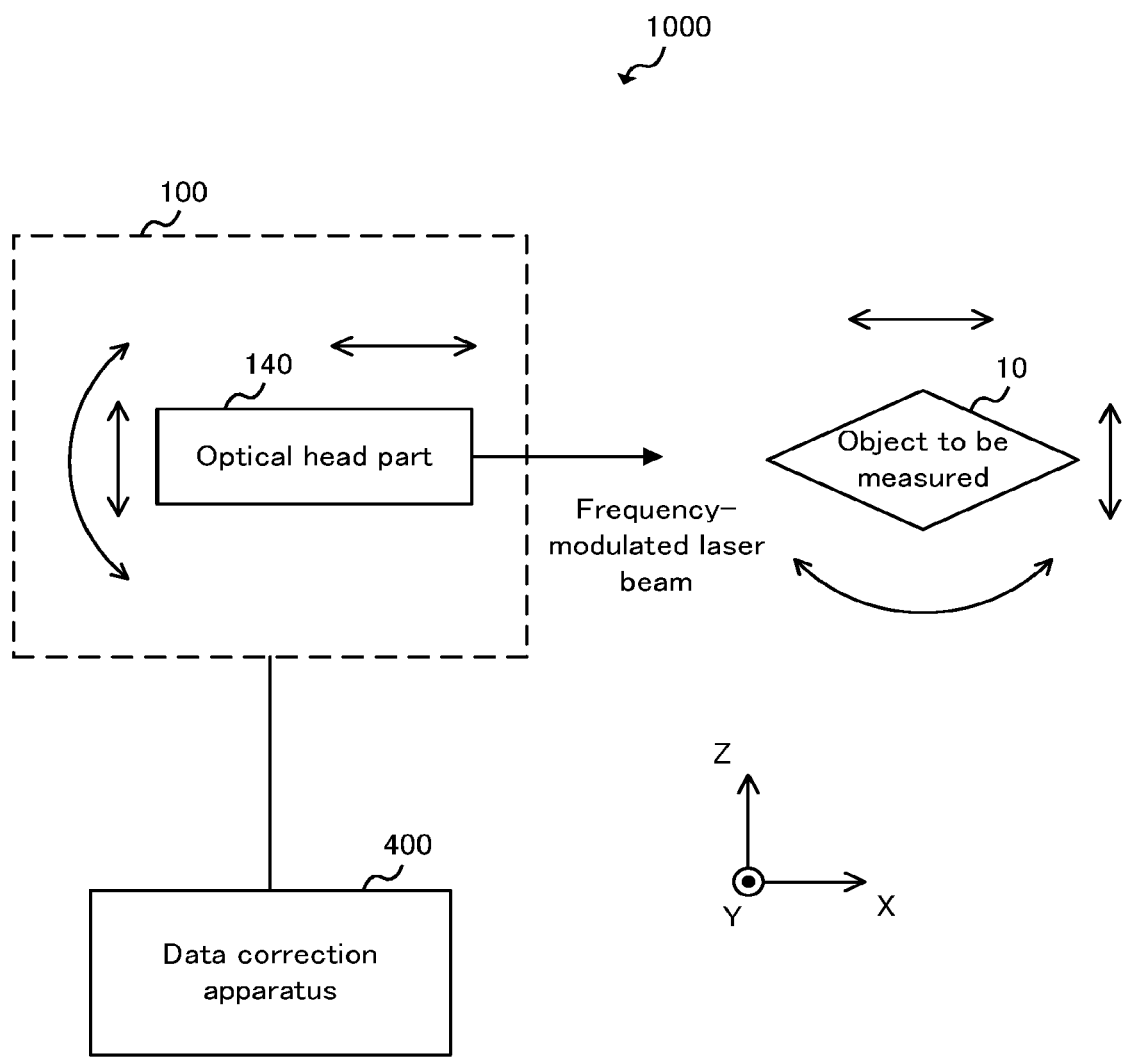
FIG. 1 shows a configuration example of a measurement system 1000 according to the present embodiment together with an object to be measured 10.

FIG. 1 shows a configuration example of a measurement system 1000 according to the present embodiment together with an object to be measured 10. The measurement system 1000 measures a three-dimensional geometry of the object to be measured 10 while suppressing a reduction in measurement accuracy due to the Doppler shift. The measurement system 1000 includes a measurement apparatus 100 and a data correction apparatus 400.

The measurement apparatus 100 optically measures a distance from a reference position to the object to be measured 10. The measurement apparatus 100 is a device capable of measuring a three-dimensional geometry of the object to be measured 10 by periodically measuring the distance while moving at least one of (i) the object to be measured 10 or (ii) at least a part of the measurement apparatus 100. Here, the reference position is a position inside the measurement apparatus 100, for example. The reference position, as an example, is a laser beam exit end of an optical head part 140 that radiates the laser beam onto the object to be measured 10 to measure the distance.

For example, the measurement apparatus 100 moves the optical head part 140 such that the optical head part 140 scans a position where a surface of the object to be measured 10 is irradiated by the laser beam. In this case, it is preferable that the optical head part 140 is provided such that it is movable in parallel to the object to be measured 10.

The optical head part 140 is movable in an X-direction, a Y-direction, and a Z-direction orthogonal to each other, for example. Further, the optical head part 140 is rotatably provided so as to be rotatable about at least one direction, as an axis, among the X-direction, the Y-direction, and the Z-direction. Alternatively or additionally, by moving an optical component such as a mirror, lens, or the like, the optical head part 140 may scan the position where the laser beam irradiates the object to be measured 10.

Alternatively or additionally, the measurement apparatus 100 may be configured to be movable. In this case, the measurement apparatus 100 further includes an apparatus stage, on which the measurement apparatus 100 is mounted, and scans the position where the laser beam irradiates the object to be measured 10 by moving the apparatus stage. The apparatus stage moves the measurement apparatus 100 in the X-direction, the Y-direction, and the Z-direction, for example. Also, the apparatus stage may rotate the measurement apparatus 100 about at least one direction, as an axis, among the X-direction, the Y-direction, and the Z-direction.

Alternatively or additionally, the object to be measured 10 may be movable. In this case, the measurement apparatus 100 further includes an object stage, on which the object to be measured 10 is mounted, and scans the position where the laser beam irradiates the object to be measured 10 by moving the object stage. The object stage moves the object to be measured 10 in the X-direction, the Y-direction, and the Z-direction, for example. Further, the object stage may rotate about at least one direction, as an axis, among the X-direction, Y-direction, and the Z-direction.

As described above, the measurement apparatus 100 measures the three-dimensional geometry of the object to be measured 10 by moving at least one of (i) the object to be measured 10 or (ii) at least a part of the measurement apparatus 100 and continuing to measure the distance while scanning the position where the laser beam irradiates the object to be measured 10. Then, the data correction apparatus 400 corrects a measurement result of the measurement apparatus 100. Next, the measurement apparatus 100 and the data correction apparatus 400 are described in detail.

[Configuration Example of the Measurement Apparatus 100]

Figure 2:
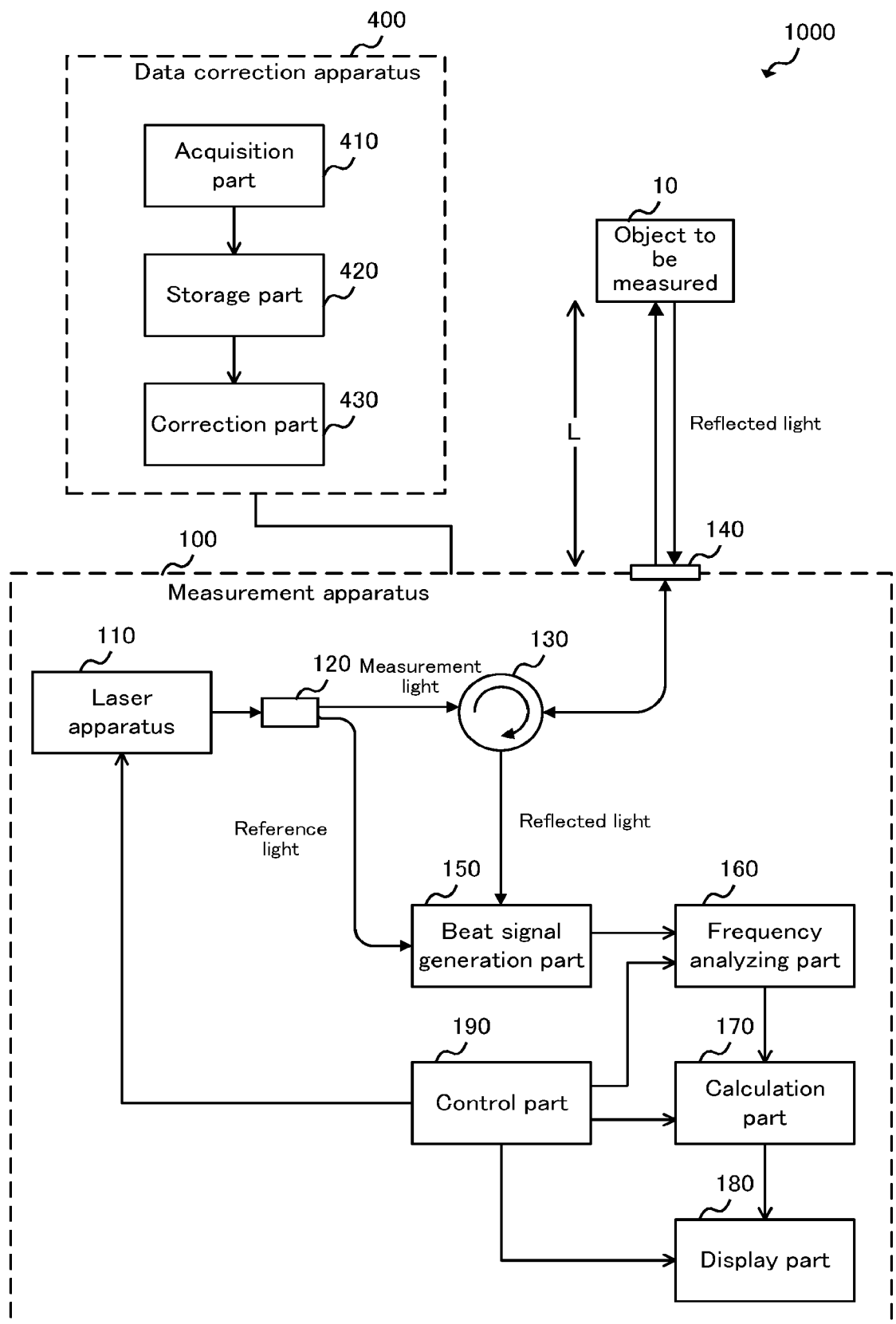
FIG. 2 shows a configuration example of a measurement apparatus 100 and a data correction apparatus 400 according to the present embodiment.

FIG. 2 shows a configuration example of the measurement apparatus 100 and the data correction apparatus 400 according to the present embodiment. The measurement apparatus 100 includes a laser apparatus 110, a branching part 120, an optical circulator 130, an optical head part 140, a beat signal generation part 150, a frequency analyzing part 160, a calculation part 170, a display part 180, and a control part 190.

The laser apparatus 110 has an optical cavity (laser resonator) and outputs a frequency-modulated laser beam with a plurality of modes. The laser apparatus 110 is provided with a frequency shifter in a cavity (resonator,) and outputs a plurality of longitudinal mode lasers whose oscillation frequencies change linearly with the passage of time. The laser apparatus 110 is a frequency-shifted feedback laser (FSFL), for example. The FSFL will be described later.

The branching part 120 splits the frequency-modulated laser beam output from the laser apparatus 110 into (i) a reference light, which is a portion of the frequency-modulated laser beam, and (ii) a measurement light, which is at least some of the remaining portion of the frequency-modulated laser beam. The branching part 120 is a one-in-two-out fiberoptic coupler, for example. In the example of FIG. 2, the branching part 120 supplies the measurement light to the optical circulator 130 and the reference light to the beat signal generation part 150.

The optical circulator 130 has a plurality of input/output ports. For example, the optical circulator 130 outputs a light, which is input from one port, to the next port, and further outputs a light, which is input from the next port, to the port after next. FIG. 2 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140 to the beat signal generation part 150.

The optical head part 140 radiates the light input from the optical circulator 130 toward the object to be measured 10. The optical head part 140 includes a collimator lens, for example. In this case, the optical head part 140 first adjusts the light input from the optical circulator 130 via an optical fiber into a beam shape using a collimator lens, and then outputs the light.

Also, the optical head part 140 receives a reflected light of the measurement light radiated onto the object to be measured 10. The optical head part 140 focuses the received reflected light onto the optical fiber with a collimator lens and supplies it to the optical circulator 130. In this case, the optical head part 140 may include one common collimator lens, and the collimator lens may irradiate the object to be measured 10 with the measurement light and receive the reflected light from the object to be measured 10. The distance between the optical head part 140 and the object to be measured 10 is defined as L.

Alternatively, the optical head part 140 may include a focusing lens. In this case, the optical head part 140 focuses the light input from the optical circulator 130 via the optical fibers onto the surface of the object to be measured 10. The optical head part 140 receives at least a part of the reflected light reflected on the surface of the object to be measured 10. The optical head part 140 focuses the received reflected light onto an optical fiber using the focusing lens and supplies the light to the optical circulator 130. Also in this case, the optical head part 140 may include one common focusing lens, and the focusing lens may irradiate the object to be measured 10 with the measurement light and receive the reflected light from the object to be measured 10.

The beat signal generation part 150 receives, from the optical circulator 130, the reflected light that is reflected by radiating the measurement light onto an object to be measured 10. Also, the beat signal generation part 150 receives the reference light from the branching part 120. The beat signal generation part 150 includes an optical coupler or the like, and mixes the reflected light and the reference light to generate a beating signal. The beat signal generation part 150 includes a photoelectric conversion element, for example, converts the beat signal into an electrical signal, and outputs the electrical signal. The beat signal generation part 150 may also quadrature-detect the reflected light and the reference light.

Here, since the reflected light travels back and forth across the distance from the optical head part 140 to the object to be measured 10, a difference in a propagation distance corresponding to at least the distance 2L occurs as compared with the reference light. Since the oscillation frequency of the light output from the laser apparatus 110 changes linearly with the passage of time, a frequency difference, which is dependent on a propagation delay corresponding to the difference in the propagation distance, occurs between the oscillation frequency of the reference light and the oscillation frequency of the reflected light. The beat signal generation part 150 generates a beat signal corresponding to such a frequency difference.

The frequency analyzing part 160 performs a frequency analysis on the beat signal generated by the beat signal generation part 150. For example, the frequency analyzing part 160 converts the beat signal into a digital signal, and converts the converted digital signal into a frequency signal. Then, the frequency analyzing part 160 detects the frequency of the beat signal by analyzing the frequency signal generated by converting the beat signal into a frequency-domain signal. The frequency analyzing part 160 detects a peak frequency of the beat signal, for example. Here, the frequencies of the beat signals are defined as $v_B$.

The calculation part 170 calculates a difference of the propagation distance between the reference light and the measurement light, based on a result of the frequency analysis which the frequency analyzing part 160 performed on the beat signals. The calculation part 170 calculates the distance L from the optical head part 140 to the object to be measured 10 on the basis of the frequency $v_B$ of the beat signal.

The display part 180 displays the calculation result of the calculation part 170. The display part 180 may include a display or the like and display the calculation result. Also, the display part 180 may store the calculation result in a storage part or the like. The display part 180 may supply the calculation result to an external device via a network or the like.

The control part 190 controls each part of the measurement apparatus 100. The control part 190 controls the laser apparatus 110 to output the frequency-modulated laser beam, for example. Further, the control part 190 controls the frequency analyzing part 160 and the calculation part 170 to calculate the distance L from the optical head part 140 to the object to be measured 10. The control part 190 may control the display part 180 to display the calculation result of the distance L. The control part 190 may transmit and receive measurement data to and from the data correction apparatus 400. For example, the control part 190 supplies the measurement data to the data correction apparatus 400. The control part 190 also receives the measurement data corrected by the data correction apparatus 400.

It is preferable that at least a part of the frequency analyzing part 160, the calculation part 170, and the control part 190 is formed by an integrated circuit or the like. At least a part of the frequency analyzing part 160, the calculation part 170, and the control part 190 includes, for example, a field programmable gate array (FPGA), a digital signal processor (DSP), and/or a central processing unit (CPU). Further, the frequency analyzing part 160, the calculation part 170, and the control part 190 may be integrally formed. Such a control part 190 has the storage part.

The storage part may store intermediate data, calculation results, set values, thresholds, parameters, and the like, which are generated or used in an operation process of the frequency analyzing part 160, the calculation part 170, and the control part 190. The storage part may provide the stored data to a request source in response to a request from each part of the measurement apparatus 100.

The storage part may store an operating system (OS) and various pieces of information such as programs which function as the frequency analyzing part 160, the calculation part 170, and the control part 190 when the CPU or the like operates as at least a part of the frequency analyzing part 160, the calculation part 170, and the control part 190. The storage part may also store various types of information including a database to be referred to at the time of executing the programs. Also, the storage part may store various types of information including a database to be referred to at the time of executing the programs. For example, a computer functions as the frequency analyzing part 160, the calculation part 170, and the control part 190 by executing the programs stored in the storage part.

The storage part includes, for example, a read only memory (ROM) storing a basic input output system (BIOS) or the like of a computer or the like, and a random access memory (RAM) serving as a work area. The storage part may include a large-capacity storage device like a hard disk drive (HDD) and/or a solid state drive (SSD). Also, the computer may further include a graphics processing unit (GPU) or the like.

The measurement apparatus 100 described above can measure the distance L between the measurement apparatus 100 and the object to be measured 10 by analyzing the frequency difference between the reference light and the reflected light of the measurement light radiated onto the object to be measured 10. That is, the measurement apparatus 100 can form a non-contact and non-destructive optical distance meter.

[Configuration Example of the Laser Apparatus 110]

Figure 3:
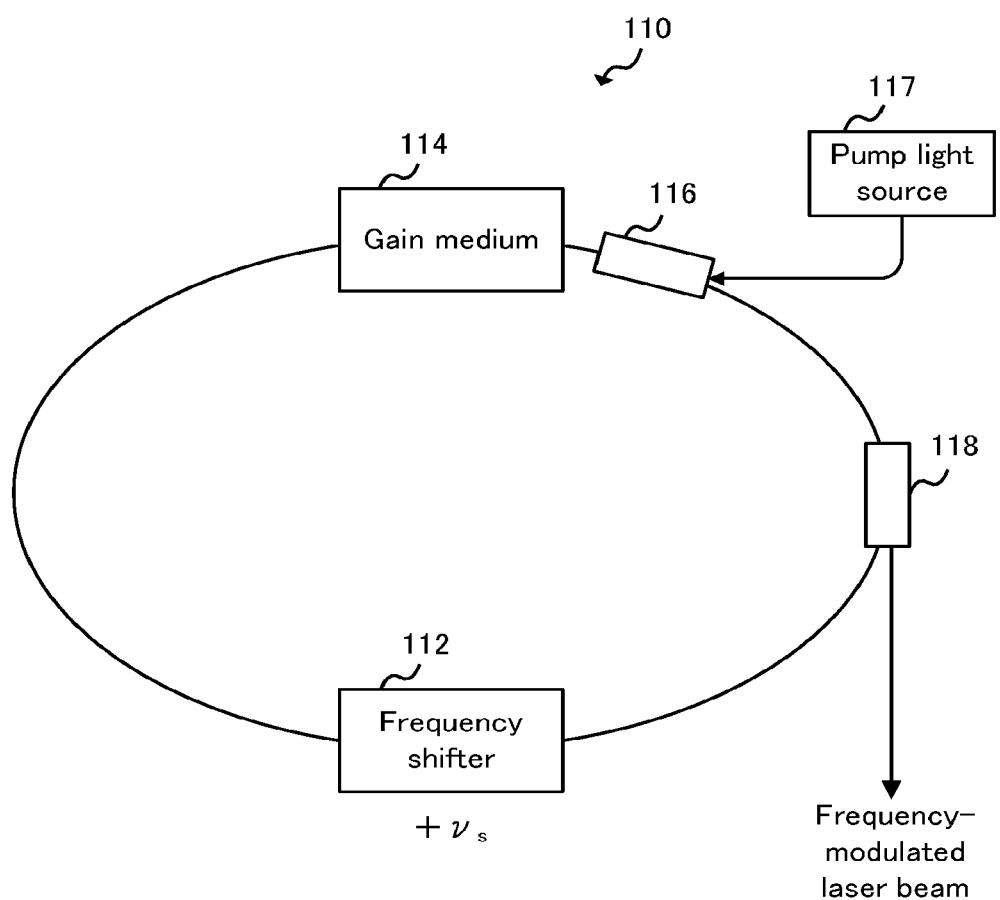
FIG. 3 shows a configuration example of a laser apparatus 110 according to the present embodiment.

FIG. 3 shows a configuration example of the laser apparatus 110 according to the present embodiment. The laser apparatus 110 of FIG. 3 shows an example of the FSFL. The laser apparatus 110 includes an optical cavity and oscillates a laser beam in the optical cavity. The optical cavity of the laser apparatus 110 includes a frequency shifter 112, a gain medium 114, a WDM coupler 116, a pump light source 117, and an output coupler 118.

The frequency shifter 112 shifts a frequency of a light to be input by an approximately constant frequency. The frequency shifter 112 is, for example, an acousto-optic frequency shifter (AOFS) having acousto-optic elements. Here, the amount of the frequency shift by the frequency shifter 112 is defined as $+v_s$. That is, the frequency shifter 112 shifts the frequency of the light circulating around the cavity to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser-oscillated in the cavity.

That is, the laser apparatus 110 shown in FIG. 3 contains a fiber ring laser having the frequency shifter 112 in the cavity. The laser apparatus 110 preferably further includes an isolator in the cavity. Also, the laser apparatus 110 may have an optical bandpass filter that passes light of a predetermined wavelength band in the cavity. The following describes frequency characteristics of the laser beam output from the laser apparatus 110.

Figure 4:
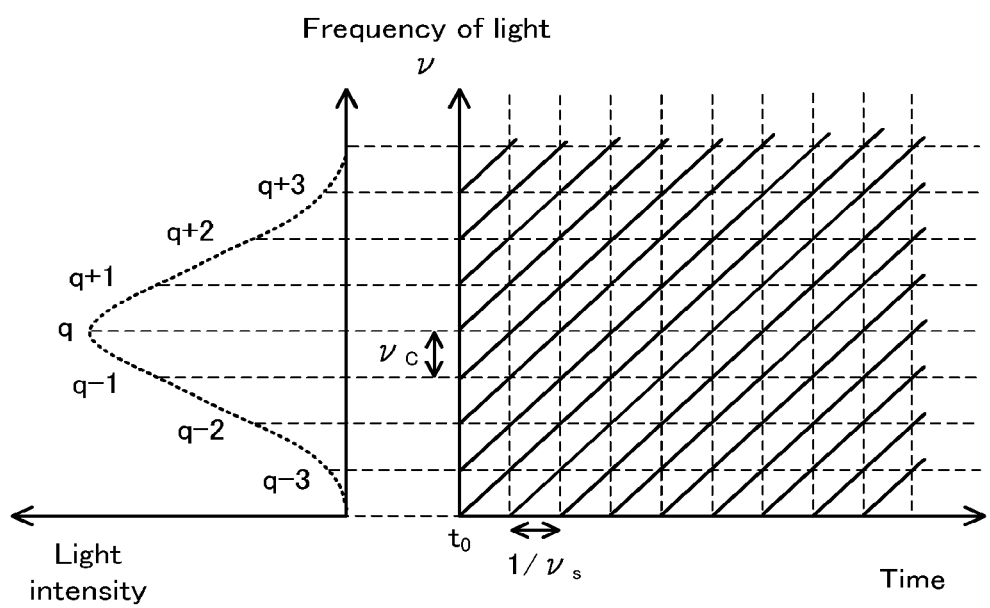
FIG. 4 shows an example of a laser beam output from the laser apparatus 110 according to the present embodiment.

FIG. 4 shows an example of the laser beam output from the laser apparatus 110 according to the present embodiment. FIG. 4 shows, on the left, a light spectrum of the laser beam output from the laser apparatus 110 at the time $t_0$. In the light spectrum, the horizontal axis indicates the light intensity, and the vertical axis indicates the frequency of the light. Also, a plurality of longitudinal modes of the light spectrum are denoted by the numbers q. The frequencies of the plurality of longitudinal modes are arranged at approximately constant frequency intervals. Supposing that $\tau_{RT}(=1/v_C)$ denotes the time for light to go around the cavity once, the plurality of longitudinal modes are arranged at intervals of $1/\tau_{RT}(=v_C)$, as represented by the following equation. It should be noted that $v_0$ is the initial frequency of the light spectrum at the time $t_0$. Also, $v_C$ is a cavity frequency (resonator frequency) $v_C$ of the optical cavity.

$$v_q(t_0) = v_0 + \frac{q}{\tau_{RT}} \qquad \text{[Equation 1]}$$

FIG. 4 shows, on the right, changes in frequencies with the passage of time of the plurality of longitudinal modes output by the laser apparatus 110. On the right side of FIG. 4, the horizontal axis indicates the time and the vertical axis indicates the frequency. That is, FIG. 4 shows a change over time in the frequency of the laser beam output from the laser apparatus 110 on the right side, and shows an instantaneous frequency of the laser beam at the time $t_0$ on the left side.

In the laser apparatus 110, each time the light in the cavity goes around the cavity, the frequency shifter 112 increases the frequency of the light traveling around the cavity by $v_s$. That is, since the frequency of each of the modes increases by $v_s$ for every passing of $\tau_{RT}$, the rate of change of frequency dv/dt (i.e., chirp rate) becomes approximately equal to $v_s/\tau_{RT}$. Therefore, the plurality of longitudinal modes represented by Equation 1 change as shown in the following equation with the passage of the time t.

$$v_q(t) = v_0 + \frac{v_s}{\tau_{RT}}t + \frac{q}{\tau_{RT}} \qquad \text{[Equation 2]}$$

[Details of a Distance Measurement Process]

The measurement apparatus 100 according to the present embodiment measures the distance L between the optical head part 140 and the object to be measured 10 by using the laser apparatus 110 that outputs the frequency elements represented by Equation 2. Suppose that an optical path difference between the reference light and the reflected light is only the distance 2L, which is the reciprocated distance L, and the propagation delay corresponding to the distance 2L is Δt. That is, when the measurement light is reflected and returned from the object to be measured 10 at the time t, the frequency of the returned reflected light approximately matches the past frequency that is a time Δt earlier than the time t, and therefore can be expressed by the following equation.

$$v_q(t - \Delta t) = v_0 + \frac{v_s}{\tau_{RT}}(t - \Delta t) + \frac{q}{\tau_{RT}} \qquad \text{[Equation 3]}$$

On the other hand, the reference light at the time t can be expressed by the following equation in a similar manner as with Equation 2, where the reference light is $v_{q'}(t)$.

$$v_{q'}(t) = v_0 + \frac{v_s}{\tau_{RT}}t + \frac{q'}{\tau_{RT}} \qquad \text{[Equation 4]}$$

Because the beat signal generation part 150 superposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B$, $v_B$ can be expressed by the following equation from Equations 3 and 4. It should be noted that M is a difference of the longitudinal mode numbers (=q−q'), Δt=2L/c, c=$c_0$/n, and $1/\tau_{RT}=v_C$. Incidentally, Y (=$v_s \cdot v_C$) is a parameter based on the rate of change of frequency per unit time of a frequency-modulated laser beam, and is called a chirp rate. In addition, n is a refractive index of the air, and $c_0$ is the speed of light in a vacuum. For simplicity, a case where M=0 is described below.

$$v_B = v_{q'}(t) - v_q(t - \Delta t) = \frac{2v_s v_c}{c}L - Mv_c = 2\gamma\frac{nL}{c_0} \qquad \text{[Equation 5]}$$

From Equation 5, the distance L is expressed by the following equation.

$$L = \frac{c_0}{2\gamma n}v_B \qquad \text{[Equation 6]}$$

From Equation 6, it can be seen that the distance L can be calculated from an observation result of the frequency $v_B$ of the beat signal. When the difference M is not 0, the distance L can be calculated by identifying the value of M by detecting a change in the beat signal when the amount of the frequency shift $v_s$ of the laser apparatus 110 is changed. Since such a method of determining the difference M is known, as described in Patent Document 1 or the like, its detailed description is omitted.

As described above, the measurement apparatus 100 can measure the distance L from the optical head part 140 to the object to be measured 10. Further, the measurement apparatus 100 may calculate and output a distance from the reference position to the object to be measured 10 by adding an offset value corresponding to the reference position to the distance L.

The three-dimensional geometry of the object to be measured 10 can be measured using such a measurement apparatus, as described above. However, since the laser beam has a wave-like nature, the Doppler shift occurs due to the relative velocity between the optical head part 140 and the object to be measured 10, and the frequency of the reflected light reflected from the object to be measured 10 may change. In this case, a reduction in measurement accuracy may occur when the frequency of the reflected light changes, since the measurement apparatus 100 measures the distance on the basis of the frequency difference between the reference light and the reflected light, as described above.

Generally, an amount of the Doppler shift $v_D$ of the optical frequency is expressed by the following equation, where V is a relative velocity between a light source and an observer, and the direction in which the light source and the observer move towards each other is a positive value. λ is the wavelength of light.

$$v_D = \frac{V}{\lambda} \quad \text{[Equation 7]}$$

Because the measurement apparatus 100 reciprocates the FSFL between the optical head part 140 and the object to be measured 10, the Doppler shift amount $v_D$ of the frequency of the reflected light is expressed by the following equation.

$$v_D = -\frac{2}{\lambda} \cdot \frac{dL}{dt} \quad \text{[Equation 8]}$$

Supposing that the beat frequency is $v_B$ when the Doppler shift occurs, $v_B'$ is expressed by the following equation.

$$v_B' = v_B + v_D \quad \text{[Equation 9]}$$

Here, the following equation is obtained through simplification by substituting Equation 6 and Equation 8 into Equation 9. Here, L' shows a measurement result of the measurement apparatus 100 when it is affected by the Doppler shift, and $k = 2c_0/\lambda n\gamma$.

$$L' = L - k\frac{dL}{dt} \quad \text{[Equation 10]}$$

As described above, when the measurement of the distance by the measurement apparatus 100 is executed by moving at least one of (i) the object to be measured 10 or (ii) at least a part of the measurement apparatus 100, it can be seen that the measurement result includes an error based on the Doppler shift. In order to reduce such an error, it is conceivable to detect the moving speed of the object to be measured 10, at least a part of the measurement apparatus 100, or the like, and calculate and correct the Doppler shift amount on the basis of the detection result. However, mounting of a speedometer or the like further in the measurement apparatus 100 causes an increase in cost and an increase in the scale of the apparatus.

[Configuration Example of the Data Correction Apparatus 400]

Therefore, the data correction apparatus 400 according to the present embodiment corrects, without using a measurement result of a velocity system, the error based on the Doppler shift included in the measurement result of the measurement apparatus 100. The data correction apparatus 400 is incorporated in the measurement apparatus 100, for example, and is integrally formed with the measurement apparatus 100. In this case, it is preferable that the data correction apparatus 400 is formed by an integrated circuit or the like, in a similar manner as the control part 190 or the like. Further, the data correction apparatus 400 may be integrally formed with the control part 190 or the like. In this case, for example, the measurement apparatus 100 functions as the calculation part 170, the control part 190, and the data correction apparatus 400 by executing the programs stored in the storage part of the measurement apparatus 100.

Alternatively, the data correction apparatus 400 may be a device independent of the measurement apparatus 100. In this case, it is preferable that the data correction apparatus 400 is formed by a computer having a processor. As shown in FIG. 1, the data correction apparatus 400 includes an acquisition part 410, a storage part 420, and a correction part 430.

The acquisition part 410 acquires the measurement data, which the measurement apparatus 100 has obtained by periodically measuring the distance from the reference position to the object to be measured 10 while moving at least one of (i) the object to be measured 10 or (ii) at least a part of measurement apparatus 100. It should be noted that the time interval for the measurement apparatus 100 to measure the distance is Δt. Also, a measurement result of the distance output by the measurement apparatus 100 during a measurement period including a period in which the measurement apparatus 100 had moved the relative positions of the measurement apparatus 100 and the object to be measured 10 shall be a first measurement result.

Here, at least one of (i) data at a head of the measurement data or (ii) data at a tail of the measurement data that is acquired by the acquisition part 410 is data indicating a result of measuring the distance when the object to be measured 10 and the measurement apparatus 100 are in a stationary state. The result of measuring the distance by the measurement apparatus 100 when the object to be measured 10 and the measurement apparatus 100 are in a stationary state shall be a second measurement result. The acquisition part 410 then acquires measurement data in which the first measurement result is arranged in time series and the second measurement result is arranged at the head or the tail of the first measurement result.

In other words, the measurement apparatus 100 generates the measurement data in which the first measurement result that is obtained by periodically measuring the distance while moving at least one of (i) the object to be measured 10 or (ii) at least a part of the measurement apparatus 100, is arranged in time series and the second measurement result that is obtained by measuring the distance when the object to be measured 10 and the measurement apparatus 100 are in a stationary state is arranged at the head or the tail of the first measurement result. The acquisition part 410 may acquire such measurement data from the measurement apparatus 100, or may alternatively acquire such measurement data from an external database or the like. The acquisition part 410 is preferably connected to a database via a network.

The storage part 420 stores at least some of intermediate data, calculation results, set values, thresholds, parameters, and the like which are generated or used in an operation process of the data correction apparatus 400. The storage part 420 stores the measurement data acquired by the acquisition part 410, for example. The storage part 420 may provide the stored data to a request source in response to a request from each part of the data correction apparatus 400.

The storage part 420 may store an operating system (OS) and various pieces of information such as programs which function as the acquisition part 410 and the correction part 430 when the CPU or the like operates as at least a part of the acquisition part 410 and the correction part 430. The storage part 420 may also store various types of information including a database to be referred to at the time of executing the programs. For example, a computer functions as the acquisition part 410 and the correction part 430 by executing the programs stored in the storage part 420.

The storage part 420 includes, for example, a read only memory (ROM) storing a basic input output system (BIOS) or the like of a computer or the like, and a random access memory (RAM) serving as a work area. The storage part 420 may include a large-capacity storage device like a hard disk drive (HDD) and/or a solid state drive (SSD). Also, the computer may further include a graphics processing unit (GPU) or the like. The storage part 420 may have at least a part of the functions of the storage part of the measurement apparatus 100. For example, when the measurement apparatus 100 and the data correction apparatus 400 are integrally formed, it is preferable that the storage part 420 operates as the storage part of the measurement apparatus 100.

[Example of an Error Correction by the Correction Part 430]

The correction part 430 applies the measurement data acquired by the acquisition part 410 to a recurrence formula to correct an error, which is included in the measurement data, that is based on the movement of at least one of (i) the object to be measured 10 or (ii) at least a part of the measurement apparatus 100. The following describes a predetermined recurrence formula used by the correction part 430. Generally, the derivative of a function f(x) with respect to x can be approximated by a forward difference method, as in the following equation.

$$\frac{df}{dx} \approx \frac{f(x+\Delta x) - f(x)}{\Delta x} \quad \text{[Equation 11]}$$

The derivative of the function f(x) with respect to x can also be approximated by a backward difference method, as in the following equation.

$$\frac{df}{dx} \approx \frac{f(x) - f(x-\Delta x)}{\Delta x} \quad \text{[Equation 12]}$$

By using Equation 11, time differential data $dL_n/d\Delta t$, which is measurement data $L_n$ of the n-th distance, is expressed by the following equation.

$$\frac{dL_n}{dt} \approx \frac{L_{n+1} - L_n}{\Delta t} \quad \text{[Equation 13]}$$

Similarly, by using Equation 12, the time differential data $dL_n/d\Delta t$ is expressed by the following equation.

$$\frac{dL_n}{dt} \approx \frac{L_n - L_{n-1}}{\Delta t} \quad \text{[Equation 14]}$$

The following equations are obtained through simplifying by substituting Equation 13 into Equation 10 and substituting Equation 14 into Equation 10.

$$L'_n = L_n - \frac{k}{\Delta t}(L_{n+1} - L_n) \quad \text{[Equation 15]}$$

$$L'_n = L_n - \frac{k}{\Delta t}(L_n - L_{n-1}) \quad \text{[Equation 16]}$$

Here, when the chirp rate γ>0, the following equations are obtained by simplifying Equations 15 and 16, as s=k/Δt. It should be noted that Equation 18 shows a result of using a substitution of n→n+1.

$$L_n = \frac{1}{s+1}L'_n + \frac{s}{s+1}L_{n+1} \quad \text{[Equation 17]}$$

$$L_n = \frac{1}{s}L'_{n+1} + \frac{s-1}{s}L_{n+1} \quad \text{[Equation 18]}$$

The correction part 430 corrects an error included in the measurement data using a recurrence formula, as shown in Equations 17 and 18, based on a time derivative of the measurement result of the measurement apparatus 100. The recurrence formula shown in Equations 17 and 18 is an equation used for correcting the measurement data $L_n$ of the n-th distance, using measurement data $L_{n+1}$ of the n+1st distance. In order to correct a certain piece of measurement data, the next measurement data is used, and therefore it is preferable that at least the last piece of the measurement data among the measurement data be the second measurement result obtained by measuring the distance when the object to be measured 10 and the measurement apparatus 100 are in a stationary state.

In other words, when the chirp rate γ is positive, the acquisition part 410 acquires measurement data in which the second measurement result is arranged at the tail of the first measurement result, and the correction part 430 uses a recurrence formula that corrects the measurement data arranged in time series acquired by the acquisition part 410 in a reverse order of the time series of the arrangement. In this case, the data correction apparatus 400 corrects the measurement data after the measurement apparatus 100 generates all the measurement data.

The following equation shows a more specific example when the correction part 430 corrects the measurement data by using Equation 17 as the recurrence formula. $L_n'$ of the following equation shows an example of the second measurement result.

$$L_{n-1} = \frac{1}{s+1}L'_{n-1} + \frac{s}{s+1}L'_n \quad \text{[Equation 19]}$$

$$L_{n-2} = \frac{1}{s+1}L'_{n-2} + \frac{s}{s+1}L_{n-1}$$

$$\vdots$$

$$L_1 = \frac{1}{s+1}L'_1 + \frac{s}{s+1}L_2$$

As described above, the data correction apparatus 400 according to the present embodiment can reduce the error based on the Doppler shift by applying the measurement data to the predetermined recurrence formula. Therefore, the data correction apparatus 400 can easily reduce the error without using the speedometer or the like. It is needless to say that the first measurement result may include the measurement result of measuring the distance when the object to be measured 10 and the measurement apparatus 100 are in a stationary state, a measurement result when the direction of the relative velocity of the object to be measured 10 and the measurement apparatus 100 is changed, and the like.

In the above data correction apparatus, an example in which the chirp rate γ is positive has been described, but the present embodiment is not limited to this. For example, when the chirp rate γ is negative (γ<0), the following equations are obtained by simplifying each of Equations 15 and 16, as s=−k/Δt. It should be noted that Equation 20 shows a result of using a substitution of n→n−1.

$$L_n = \frac{1}{s}L'_{n-1} + \frac{s-1}{s}L_{n-1} \quad \text{[Equation 20]}$$

$$L_n = \frac{1}{s+1}L'_n + \frac{s}{s+1}L_{n-1} \quad \text{[Equation 21]}$$

The correction part 430 corrects an error included in the measurement data using a recurrence formula, as in Equations 20 and 21, based on the time derivative of the measurement result of the measurement apparatus 100. In this manner, the correction part 430 uses different recurrence formulas according to the positive and negative signs of the chirp rate of the frequency-modulated laser beam used by the measurement apparatus 100. The recurrence formula shown in Equations 20 and 21 is an equation used for correcting the measurement data $L_n$ of the n-th distance, using measurement data $L_{n-1}$ of the n−1-th distance. In order to correct a certain piece of measurement data, the previous measurement data is used, therefore it is preferable that at least the first piece of measurement data among the measurement data be the second measurement result obtained by measuring the distance when the object to be measured 10 and the measurement apparatus 100 are in a stationary state.

In other words, when the chirp rate γ is negative, the acquisition part 410 acquires measurement data in which the second measurement result is arranged at the head of the first measurement result, and the correction part 430 uses a recurrence formula that corrects the measurement data arranged in time series acquired by the acquisition part 410 in the order of time series of the arrangement. In this case, the data correction apparatus 400 corrects the measurement data after the measurement apparatus 100 generates all the measurement data, for example.

Alternatively, the measurement apparatus 100 may generate the measurement result while measuring the distance, and the data correction apparatus 400 may acquire and sequentially correct the measurement result generated by the measurement apparatus 100. In this manner, since the data correction apparatus 400 can sequentially correct the measurement result while the measurement apparatus 100 performs the distance measurement a plurality of times, it is possible to reduce the time between the start of the measurement and the output of a correction result.

The following equation shows a more specific example when the correction part 430 uses Equation 21 as the recurrence formula to correct the measurement data. $L_1'$ of the following equation shows an example of the second measurement result.

$$L_2 = \frac{1}{s+1}L'_2 + \frac{s}{s+1}L'_1 \quad \text{[Equation 22]}$$
$$L_3 = \frac{1}{s+1}L'_3 + \frac{s}{s+1}L_2$$
$$\vdots$$
$$L_n = \frac{1}{s+1}L'_n + \frac{s}{s+1}L_{n-1}$$

An example where the data correction apparatus 400 according to the present embodiment uses the recurrence formula based on the time differential data $dL_n/d\Delta t$, shown in Equations 13 and 14, has been described, but the present embodiment is not limited to this. The data correction apparatus 400 may use a difference method with m-th order accuracy to increase accuracy of the approximation of the time differential data $dL_n/d\Delta t$. The difference method with m-th order accuracy approximates the derivative of the function f(x) with respect to x as the following equation.

$$\frac{df}{dx} \approx \frac{\sum_{i=0}^{m} a_i f(x + i\Delta x)}{b\Delta x} \quad \text{[Equation 23]}$$

Or $$\frac{df}{dx} \approx -\frac{\sum_{i=0}^{m} a_i f(x - i\Delta x)}{b\Delta x} \quad \text{[Equation 24]}$$

The combination of coefficients ($a_0, a_1, \ldots, a_m$, b) is widely known, and for example, when m=2, it is (−3, 4, −1, 2). The correction part 430 can correct the error due to the Doppler shift more accurately by using recurrence formulas based on Equation 23 and Equation 24. The recurrence formula based on Equation 23 and the recurrence formula based on Equation 24 are different recurrence formulas according to the positive and negative signs of the chirp rate γ, as described above.

For example, when the chirp rate γ is positive, the corresponding recurrence formula is expressed as the following equation obtained through simplifying by substituting Equation 23 into Equation 10. Here, s=k/Δt.

$$L_n = \frac{1}{1 - \frac{a_0}{b}s}L'_n + \frac{\frac{s}{b}}{1 - \frac{a_0}{b}s}\sum_{i=1}^{m} a_i L_{n+i} \quad \text{[Equation 25]}$$

Further, when the chirp rate γ is negative, the corresponding recurrence formula is expressed as the following equation obtained through simplifying by substituting Equation 24 into Equation 10. Here, s=−k/Δt.

$$L_n = \frac{1}{1 - \frac{a_0}{b}s}L'_n + \frac{\frac{s}{b}}{1 - \frac{a_0}{b}s}\sum_{i=1}^{m} a_i L_{n-i} \quad \text{[Equation 26]}$$

When the difference method with m-th order accuracy is used, the acquisition part 410 acquires measurement data in which the second measurement result is shown, as the second data, which is m pieces of data from the head or m pieces of data from the tail of the measurement data. For example, the measurement apparatus 100 measures the distance m times when the object to be measured 10 and the measurement apparatus 100 are in a stationary state to generate measurement data in which m pieces of the second data are arranged at the head or the tail of the first measurement result. Then, the acquisition part 410 acquires such measurement data.

More specifically, when the chirp rate γ is positive, the acquisition part 410 acquires measurement data in which m pieces of the second data are arranged at the tail of the first measurement result, and the correction part 430 uses the recurrence formula that corrects the measurement data arranged in time series acquired by the acquisition part 410 in a reverse order of the time series of the arrangement. Further, when the chirp rate γ is negative, the acquisition part 410 acquires measurement data in which m pieces of the second data are arranged at the head of the first measurement result, and the correction part 430 uses the recurrence formula that corrects the measurement data arranged in time series acquired by the acquisition part 410 in the order of the time series of the arrangement.

The following equation shows a more specific example when the correction part 430 uses Equation 25 as the recurrence formula to correct the measurement data. It should be noted that, in the following equation, m=2, and $L_n'$ and $L_{n-1}'$ of the following equation each show an example of the second measurement result.

$$L_{n-2} = \frac{1}{\frac{3}{2}s+1}L'_{n-2} + \frac{s}{\frac{3}{2}s+1}\left(2L'_{n-1} - \frac{1}{2}L'_n\right) \quad [\text{Equation 27}]$$

$$L_{n-3} = \frac{1}{\frac{3}{2}s+1}L'_{n-3} + \frac{s}{\frac{3}{2}s+1}\left(2L_{n-2} - \frac{1}{2}L'_{n-1}\right)$$

$$L_{n-4} = \frac{1}{\frac{3}{2}s+1}L'_{n-4} + \frac{s}{\frac{3}{2}s+1}\left(2L_{n-3} - \frac{1}{2}L_{n-2}\right)$$

$$\vdots$$

$$L_1 = \frac{1}{\frac{3}{2}s+1}L'_1 + \frac{s}{\frac{3}{2}s+1}\left(2L_2 - \frac{1}{2}L_3\right)$$

The following equation shows a more specific example when the correction part 430 uses Equation 26 as the recurrence formula to correct the measurement data. It should be noted that, in the following equation, m=2, and $L_1'$ and $L_2'$ of the following equation each show an example of the second measurement result.

$$L_3 = \frac{1}{\frac{3}{2}s+1}L'_3 + \frac{s}{\frac{3}{2}s+1}\left(2L'_2 - \frac{1}{2}L'_1\right) \quad [\text{Equation 28}]$$

$$L_4 = \frac{1}{\frac{3}{2}s+1}L'_4 + \frac{s}{\frac{3}{2}s+1}\left(2L_3 - \frac{1}{2}L'_2\right)$$

$$L_5 = \frac{1}{\frac{3}{2}s+1}L'_5 + \frac{s}{\frac{3}{2}s+1}\left(2L_4 - \frac{1}{2}L_3\right)$$

$$\vdots$$

$$L_n = \frac{1}{\frac{3}{2}s+1}L'_n + \frac{s}{\frac{3}{2}s+1}\left(2L_{n-1} - \frac{1}{2}L_{n-2}\right)$$

Incidentally, the measurement apparatus 100 may generate measurement data including m' pieces of the second data by measuring the distance m' times, which is less than m times (0<m'<m), when the object to be measured 10 and the measurement apparatus 100 are in a stationary state. In this case, the acquisition part 410 makes only m−m' duplicates of data included in m' pieces of the second data, and generates measurement data in which m pieces of data in total are arranged at the head or the tail of the first measurement result, for example.

Here, an example in which the measurement apparatus 100 generates measurement data in which one piece of the second data is arranged at the tail of the first measurement result including p pieces of first data will be described. In this case, the control part 190 may notify the acquisition part 410 that one piece of the second data is arranged at the tail of the measurement data. The acquisition part 410 acquires measurement data including 1+p pieces of data from the measurement apparatus 100, makes only 4 duplicates of one piece of the second data at the tail, and generates measurement data including 5+p pieces of data in which 5 pieces in total of the second data are arranged at the tail of the first measurement result.

By doing this, the correction part 430 can correct an error included in p pieces of the first data by applying the measurement data including (i) m (=5) pieces of the second data and (ii) p pieces of the first data included in the first measurement result to a recurrence formula expressed by Equation 25 when m=5. In other words, even if the measurement apparatus 100 does not increase the number of pieces of second data included in the second measurement result to two or more, by duplicating the second data, the data correction apparatus 400 can further increase the accuracy of the correction using the difference method with m-th order accuracy.

The correction part 430 supplies the corrected measurement data to the measurement apparatus 100. The measurement apparatus 100 displays the corrected measurement data on the display part 180. Also, the data correction apparatus 400 may further include a display device to display the corrected measurement data.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present disclosure. Further, effects of the new embodiment brought by the combinations also have the effect of the original exemplary embodiment together.

What is claimed is:

1. A measurement system comprising:
   a measurement apparatus that measures a distance from a reference position to an object to be measured and includes
   a laser apparatus that configures a fiber ring laser with a frequency shifter in a fiber ring resonator and outputs a frequency-modulated laser beam with a plurality of longitudinal modes,
   a splitter that splits the frequency-modulated laser beam output from the laser apparatus into (i) a reference light, which is a portion of the frequency-modulated laser beam, and (ii) a measurement light, which is at least some of the remaining portion of the frequency-modulated laser beam,
   a beat signal generator that generates a beat signal by mixing the reference light and a reflected light that is reflected by radiating the measurement light onto the object to be measured,
   a frequency analyzer that frequency-analyzes the beat signal, and
   a processor that calculates the distance between the reference position and the object to be measured on a basis of a result of a frequency analysis performed on the beat signal by the frequency analyzer; and
   a data correction apparatus that is implemented by a computer and includes
   an acquisition part that acquires, from the measurement apparatus which measures the distance from the reference position to the object to be measured using the frequency-modulated laser beam and is capable of periodically measuring the distance while moving at least one of (i) the object to be measured or (ii) at least a part of the measurement apparatus, measurement data in which a first measurement result of the distance is arranged in time series and a second measurement result that is obtained by the measurement apparatus measuring the distance when the object to be measured and the measurement apparatus are in a stationary state is arranged at a head or a tail of the first measurement result; and a correction part that corrects an error included in the distance by applying the distance based on the measurement data acquired by the acquisition part to a recurrence formula based on a time derivative of a measurement result of the measurement apparatus, wherein the error is based on a relative speed between the object to be measured and the measurement apparatus, the relative speed being caused by moving at least one of the object to be measured or at least a part of the measurement apparatus in a direction toward or away from the other.

2. The measurement system according to claim 1, wherein the correction part uses different recurrence formulas according to a positive sign and a negative sign of a chirp rate that is based on a rate of change of frequency per unit time of the frequency-modulated laser beam used by the measurement apparatus.

3. The measurement system according to claim 2, wherein the acquisition part acquires the measurement data in which second measurement data is arranged at the head of the first measurement data when the chirp rate is negative, and the correction part uses a recurrence formula that corrects the measurement data arranged in time series acquired by the acquisition part in order of the time series of the arrangement.

4. The measurement system according to claim 3, wherein the correction part uses, as the recurrence formula, a first recurrence formula expressed with the following equation $$L_n = \frac{1}{s}L'_{n-1} + \frac{s-1}{s}L_{n-1} \quad (1)$$

or a second recurrence formula expressed with the following equation $$L_1 = \frac{1}{s+1}L'_1 + \frac{s}{s+1}L_{n-1} \quad (2)$$

where $L_n'$ is an n-th measurement result including the error due to a Doppler shift, $L_n$ is an n-th measurement result in which the error due to the Doppler shift has been corrected, $s=k/\Delta t$, $\Delta t$ is a time interval for the measurement apparatus to measure the distance, $k=2c_0/\lambda n\gamma$, $c_0$ is speed of light in a vacuum, $\lambda$ is a wavelength of the frequency-modulated laser beam, n is a refractive index of air, and $\gamma$ is the chirp rate.

5. The measurement system according to claim 3, wherein the correction part uses, as the recurrence formula, a third recurrence formula expressed with the following equation $$L_1 = \frac{1}{1-\frac{a_0}{b}s}L'_n + \frac{\frac{s}{b}}{1-\frac{a_0}{b}s}\sum_{i=1}^{m}a_i L_{n-i} \quad (3)$$

where $L_n'$ is an n-th measurement result including the error due to a Doppler shift, $L_n$ is an n-th measurement result in which the error due to the Doppler shift has been corrected, $s=k/\Delta t$, $\Delta t$ is a time interval for the measurement apparatus to measure the distance, $k=2c_0/\lambda n\gamma$, $c_0$ is speed of light in a vacuum, $\lambda$ is a wavelength of the frequency-modulated laser beam, n is a refractive index of air, $\gamma$ is the chirp rate, and coefficients $(a_0, a_1, \ldots, a_m, b)$ are coefficients used to approximate time differential data of the measurement data as time differential data using a difference method with m-th order accuracy.

6. The measurement system according to claim 3, wherein the acquisition part acquires the measurement data each time the measurement apparatus measures the distance, and the correction part starts correcting the measurement data acquired by the acquisition part to sequentially correct the measurement data while the measurement apparatus continues to measure the distance.

7. The measurement system according to claim 2, wherein the acquisition part acquires the measurement data in which second measurement data is arranged at the tail of the first measurement data when the chirp rate is positive, and the correction part uses a recurrence formula that corrects the measurement data arranged in time series acquired by the acquisition part in a reverse order of the time series of the arrangement.

8. The measurement system according to claim 7, wherein the correction part uses, as the recurrence formula, a fourth recurrence formula expressed with the following equation $$L_n = \frac{1}{s+1}L'_n + \frac{s}{s+1}L_{n+1} \quad (4)$$

or a fifth recurrence formula expressed with the following equation $$L_1 = \frac{1}{s}L'_{n+1} + \frac{s-1}{s}L_{n+1} \quad (5)$$

where $L_n'$ is an n-th measurement result including the error due to a Doppler shift, $L_n$ is an n-th measurement result in which the error due to the Doppler shift has been corrected, $s=k/\Delta t$, $\Delta t$ is a time interval for the measurement apparatus to measure the distance, $k=2c_0/\lambda n\gamma$, $c_0$ is speed of light in a vacuum, $\lambda$ is a wavelength of the frequency-modulated laser beam, n is a refractive index of air, and $\gamma$ is the chirp rate.

9. The measurement system according to claim 7, wherein the correction part uses, as the recurrence formula, a sixth recurrence formula expressed with the following equation $$L_n = \frac{1}{1-\frac{a_0}{b}s}L'_n + \frac{\frac{s}{b}}{1-\frac{a_0}{b}s}\sum_{i=1}^{m}a_i L_{n+i} \quad (6)$$

where $L_n'$ is an n-th measurement result including the error due to a Doppler shift, $L_n$ is an n-th measurement result in which the error due to the Doppler shift has been corrected, $s=k/\Delta t$, $\Delta t$ is a time interval for the measurement apparatus to measure the distance, $k=2c_0/\lambda n\gamma$, $c_0$ is speed of light in a vacuum, $\lambda$ is a wavelength of the frequency-modulated laser beam, n is a refractive index of air, γ is the chirp rate, and coefficients $(a_0, a_1, \ldots, a_m, b)$ are coefficients used to approximate time differential data of the measurement data as time differential data using a difference method with m-th order accuracy.

10. The measurement system according to claim 8, wherein the acquisition part acquires the measurement data in which the second measurement result, which is obtained by measuring the distance when the object to be measured and the measurement apparatus are in a stationary state, is arranged, as second data, m pieces from the head or m pieces from the tail, and the correction part corrects the error included in p pieces of first data by applying, to the recurrence formula, the measurement data including m pieces of the second data and p pieces of the first data included in the first measurement result.

11. The measurement system according to claim 10, wherein the acquisition part further acquires, from the measurement apparatus, information concerning m', which is a number of pieces of data of the second measurement result included in the measurement data, and the correction part makes only m−m' duplicates of the data of the second measurement result and then corrects the error of the measurement data when m', which is the number of pieces of data of the second measurement result included in the measurement data, is less than an order m of a difference method with m-th order accuracy.

12. A correction method executed by a computer comprising:

measuring a distance from a reference position to an object to be measured by a measurement apparatus, the measuring including outputting a frequency-modulated laser beam with a plurality of longitudinal modes from a laser apparatus that configures a fiber ring laser with a frequency shifter in a fiber ring resonator, splitting the frequency-modulated laser beam output from the laser apparatus into (i) a reference light, which is a portion of the frequency-modulated laser beam, and (ii) a measurement light, which is at least some of the remaining portion of the frequency-modulated laser beam, generating a beat signal by mixing the reference light and a reflected light that is reflected by radiating the measurement light onto the object to be measured, frequency-analyzing the beat signal, and calculating the distance between the reference position and the object to be measured on a basis of a result of a frequency analysis performed on the beat signal;

acquiring, from the measurement apparatus that measures the distance from the reference position to the object to be measured using the frequency-modulated laser beam, measurement data in which a first measurement result including a measurement result of periodically measuring the distance while moving at least one of (i) the object to be measured or (ii) at least a part of the measurement apparatus, is arranged in time series and a second measurement result, obtained by measuring the distance when the object to be measured and the measurement apparatus are in a stationary state, is arranged at a head or a tail of the first measurement result; and correcting an error included in the distance by applying the measurement data to a recurrence formula based on a time derivative of a measurement result of the measurement apparatus, wherein the error is based on a relative speed between the object to be measured and the measurement apparatus, the relative speed being caused by moving at least one of the object to be measured or at least a part of the measurement apparatus in a direction toward or away from the other.

* * * * *